(12) United States Patent
Rickers et al.

(10) Patent No.: US 7,872,800 B2
(45) Date of Patent: Jan. 18, 2011

(54) DEVICE AND METHOD FOR THE PRESENTATION OF STATIC OR MOVING IMAGES

(75) Inventors: Christoph Rickers, Braunschweig (DE); Matthias Fahland, Dresden (DE); Christoph Von Kopylow, Wilstedt (DE)

(73) Assignees: Fraunhofer-Gesellschaft zur Forderung der Angewandten Forschung E.V., München (DE); Bremer Institut fur Angewandte Strahltechnik GmbH, Bremen (DE)

( * ) Notice: Subject to any disclaimer, the term of this patent is extended or adjusted under 35 U.S.C. 154(b) by 363 days.

(21) Appl. No.: 11/659,176

(22) PCT Filed: Jul. 26, 2005

(86) PCT No.: PCT/EP2005/008121

§ 371 (c)(1), (2), (4) Date: Oct. 8, 2008

(87) PCT Pub. No.: WO2006/015722

PCT Pub. Date: Feb. 16, 2006

(65) Prior Publication Data
US 2009/0059365 A1 Mar. 5, 2009

(30) Foreign Application Priority Data
Aug. 4, 2004 (DE) .................. 10 2004 037 999
Sep. 3, 2004 (DE) .................. 10 2004 042 648

(51) Int. Cl.
G03B 21/56 (2006.01)
G03B 21/60 (2006.01)
(52) U.S. Cl. .................. 359/443; 359/454; 359/459; 353/79

(58) Field of Classification Search .................. 359/443, 359/449, 454–456, 459; 353/79
See application file for complete search history.

(56) References Cited

U.S. PATENT DOCUMENTS

| | | | | |
|---|---|---|---|---|
| 3,964,822 A | * | 6/1976 | Yamashita | 359/443 |
| 5,029,975 A | | 7/1991 | Pease | 350/96.27 |
| 5,272,473 A | | 12/1993 | Thompson et al. | 345/7 |
| 5,473,469 A | | 12/1995 | Magocs et al. | 359/449 |
| 5,696,625 A | * | 12/1997 | Malifaud et al. | 359/459 |
| 6,011,643 A | | 1/2000 | Wunderlich et al. | 359/279 |
| 6,894,835 B2 | * | 5/2005 | Ohsako et al. | 359/449 |
| 7,248,406 B2 | * | 7/2007 | May et al. | 359/452 |
| 7,499,214 B2 | * | 3/2009 | Novet et al. | 359/459 |
| 7,532,396 B2 | * | 5/2009 | Yonekubo et al. | 359/459 |
| 7,570,423 B2 | * | 8/2009 | Willard | 359/459 |
| 2003/0137728 A1 | * | 7/2003 | Kuroda et al. | 359/455 |

FOREIGN PATENT DOCUMENTS

DE 196 45 976 C1 4/1998
DE 197 47 597 A1 8/1998

(Continued)

*Primary Examiner*—Christopher Mahoney
(74) *Attorney, Agent, or Firm*—Brinks Hofer Gilson and Lione

(57) ABSTRACT

The invention relates to a device and method for displaying a static or moving picture, wherein the inventive device comprises a laser light source and a screen and is characterized in that said screen has a structure at which the illuminated parts simultaneously reflect or transmit light in different directions inside a beam width.

13 Claims, 3 Drawing Sheets

FOREIGN PATENT DOCUMENTS

| | | |
|---|---|---|
| DE | 199 01 970 C2 | 8/2000 |
| DE | 101 18 662 A1 | 11/2002 |
| EP | 0 759 185 B1 | 2/1997 |
| EP | 1 411 732 A2 | 4/2004 |
| JP | 03-109591 A | 5/1991 |
| JP | 05-173094 A | 7/1993 |
| JP | 05-241110 A | 9/1993 |
| JP | 2003-098601 A | 4/2003 |
| WO | WO 01/04701 A1 | 1/2001 |
| WO | WO 01/86349 A2 | 11/2001 |
| WO | WO 02/084380 A1 | 10/2002 |
| WO | WO 02/086618 A1 | 10/2002 |
| WO | WO 03/020195 A2 | 3/2003 |
| WO | WO 2006/015722 A1 | 2/2006 |

\* cited by examiner

DEVICE AND METHOD FOR THE PRESENTATION OF STATIC OR MOVING IMAGES

BACKGROUND

The invention relates to a device and a method for the presentation of static or moving images by means of a laser light source and a projection screen. Such methods make it possible to present photographs, video data or also numerical values on large areas. Due to the almost unlimited depth of focus of the laser light source, the application is not limited to plane projection screens.

The projection screens used in projection methods usually have diffusely dispersive, i.e. non-specular surfaces. When such a surface is irradiated with the light of a laser, there occurs a formation of speckle interferences. Speckle interferences are always formed when two coherent wave trains of the laser light are reflected on closely neighbouring points. If that reflecting structure is smaller than the resolving power of the eye, such wave trains are imaged on the retina of the viewer in one point where they form an interference due to the high coherence length of the laser light. These interferences are the reason why there occur brightness differences in a uniformly illuminated beam spot that are perceived as granularity or a speckled pattern. When the viewer moves so far away from the beam spot that the pattern cannot be resolved anymore, the beam spot appears with a brightness distribution that is varying in time or pulsating. Thus, speckle interferences do always occur when the reflecting or transmitting surfaces have a structure size within the range of the light wavelength.

For the laser projection of static or moving images, the high brilliance of the laser light is of importance in the first place. In this connection, brilliance means the number of photons per phase-space cell, i.e. per wavelength range, per space coordinate and per solid angle element. The large coherence length of the laser light that causes the undesirable speckle effect is of subordinate importance to projection methods.

For minimizing the speckle effect, it is known from the prior art to either dissolve the coherence of the laser light or to reduce the speckle contrast by means of a sufficiently quick time-variation of the speckle interferences within the integration time of the eye.

It is a simple method for destroying the coherence to lead the laser light through a rotating diffuser. For example a glass pane with a rough surface is suitable as diffuser. When the diffuser is located at the focus of the laser beam, statistic phase variations are inserted into the beam while the spatial coherence is maintained. So the beam can continue to be focussed on a point. When the unfocussed beam is led through the diffuser, both the spatial and the time-related coherence are dissolved.

DE 101 18 662 A1 discloses a projection screen in which, by means of volume dispersion of the laser light in a layer with a constant thickness applied on the projection screen, the coherence of the reflected laser light is dissolved so that the speckle effect is avoided. According to the instruction incorporated in DE 101 18 662 A1, for example polytetrafluor ethylene is suitable as diffusing layer. The thickness of the layer is adapted to the coherence length of the laser light in such a manner that the speckle effect is reduced by a desired degree. Advantageously, the thickness of the layer is chosen larger than one tenth of the coherence length. Therefore, that projection screen produces satisfactory results only with laser light sources with a low coherence length. It is another disadvantage that changes in the projector unit always require also changes in the projection screen.

It is known from U.S. Pat. No. 5,272,473 to couple a projection screen to an acoustic source so that the acoustic waves produced by the acoustic source excite vibrations of the projection screen. The wave trains reflected by the vibrating projection screen produce different speckle interferences at every point of time. When the vibration frequency is chosen large enough, these different speckle interferences are averaged during the integration time of the eye. That way, the contrasts between interference maxima and interference minima are balanced. Thus, the speckle contrast is reduced. In this connection, the speckle contrast is defined as the mean square deviation of the intensity of every place in the illuminated item from the mean value, nominated to the squared mean value. However, it is a disadvantage of this method that there are forming standing waves in the projection screen and speckle interferences occur with an unchanged intensity on the wave nodes of the projection screen.

It is known from JP 2 000 81 602 A to use a projection screen having a structure similar to that of a liquid crystal display. The irradiated laser light is reflected on the molecules of the liquid crystal in the same manner as on a conventional projection screen. If, however, a high-frequency low-voltage signal is applied to the liquid crystal, the liquid crystal molecules vibrate at the frequency of the signal applied. That way, there are produced speckle interferences varying in the same way that again are averaged during the integration time of the eye. Disadvantages of this method for avoiding speckle interferences, however, are the technological limitations with regard to the dimensions and the fact that such projection screens cannot be bended or rolled.

It is the underlying technical problem of the invention to set forth a device for the presentation of static or moving images by means of a laser light source and a projection screen in which there do not occur any speckle interferences or occurring speckle interferences are reduced to such an extent that they are not perceived as irritating anymore. The projection screen shall not be subject to any limitations as to form and size and shall be universally usable with all kinds of laser light sources. Moreover, speckle interferences shall be uniformly suppressed on the entire area of the projection screen.

Beyond this, the projection screen shall also be easily combinable with a contrast-increasing coating.

SUMMARY

According to the invention, the task is solved by means of a device for the presentation of static or moving images by means of a laser light source (3) and a projection screen (1), wherein the projection screen (1) has a structure (2) in which a transmitted or reflected laser beam is defocused on the interface between structure and environment. Moreover, the solution of the task includes a method for the presentation of static or moving images by means of a laser light source and a projection screen, wherein light simultaneously impinging on the projection screen is reflected or transmitted in different directions.

The projection screen according to the invention can be used as both, a reflecting projection screen for front projection and a transmitting projection screen for rear projection. In the former case, the structure according to the invention consists of non-transparent elements that reflect light on their surface. In the latter case, the structure according to the invention just like the projection screen consist of a translucent material that transmits the light fed by rear projection and refracts it on its surface in different directions. Of course, the projection screen according to the invention may either have a plane projection area or be curved.

By the structuring of the projection screen according to the invention, light impinging on closely neighbouring points of the projection screen is emitted in different directions. Thus, the phase space of the light reflected by the projection screen is widened in the angular coordinate. That way, two wave trains emitted on neighbouring points of the projection screen impinge on different points of the retina and are not capable of interference anymore. If the angular difference is sufficiently large, there may even impinge only one wave train on the retina while the other one is cut out on the pupil and does not reach the retina. That way, the speckle contrast is reduced as desired.

The structure can have a one-dimensional design and continue in the second direction on the plane in a translationally invariant manner. That way, there results the impression of a corrugated or trapezoidal sheet. However, the structure can also extend in both directions of the projection screen. In that case, there results the impression of drops, balls, ball caps, ball discs, cones or any kind of freeform surfaces sitting on the surface. In this connection, a harmonic surface modulation will cause a homogenous angular distribution of the reflected light and an anharmonic surface modulation will cause an inhomogeneous angular distribution of the reflected light.

Preferably, the ratio between the structure width and the diameter of the beam cross section of the laser is about 1:1. The ratio between the beam spot size and the structure width is chosen in such a manner that the laser light illuminates an essential part of a structural element so that a broad emission of the light emitted from the projection screen is ensured. Of course, the effect according to the invention is still achieved when two structural elements are illuminated in part. However, there is to be avoided a simultaneous illumination of several elements, which again would lead to the emission of two wave trains in one direction.

In this case, the structure width is defined as the minimum length of a translation vector lying on the plane of the projection screen and representing a structural element in itself.

The surface of the structural elements themselves preferably is smooth, i.e. the roughness is small compared to the wavelength of the laser. It is specially preferable when the surfaces of the structures have a roughness of less than half the wavelength of the useful frequency of the laser light.

In a preferred embodiment, the lateral extension of the structure is chosen depending on the beam cross section and/or the scanning speed and/or the beam cross section and/or the beam diameter. That way it is ensured that the condition of an enlargement of the angle of radiation is guaranteed at every point and at any time of the image projection. There is preferred a structure having about the size of a pixel. When the laser beam is continuously moved over the projection screen, the structure in the direction of the movement can have an extension that is determined by the speed of the laser beam and the pixel frequency. That way, the projection screen gets an asymmetric structure. In one embodiment of the invention, the structure shows dimensions of some hundred μm in horizontal direction and some ten μm in vertical direction.

In case of a projection screen for front projection, the structure according to the invention therefore is an arrangement of a plurality of mirrors that are designed and arranged in such a manner that the interference is avoided in the viewer's eye. Nevertheless, the reflected light is still coherent laser radiation. It is an advantage that, in the projection screen according to the invention, a dispersion in the volume of the projection screen is avoided and the image achieves a higher sharpness and contrast compared with the prior art.

By means of the ratio between the height of the structure and its width, the emission angle of the projection screen according to the invention can be adjusted in broad ranges. Especially preferred is a height-to-width ratio of about 1:8 to about 1:37. In that case, a light beam impinging vertically on the projection screen is deflected by maximally about ±40° to maximally about ±10°. In principle, the larger deflection angle is suitable for projection screens viewed by a larger number of viewers, like for example cinema or video screens.

By reducing the height-to-width ratio, the emission angle of the projection screen is reduced to about ±10°. Such projection screens are for example suited for head-up displays that address only a small circle of persons and shall not bother the environment.

By means of an asymmetric structure, it is of course also possible to realize a projection screen with asymmetric emission that for example guides less light to the ceiling of the room and to the floor and nevertheless allows for a broad horizontal viewing angle.

The structure according to the invention can be produced in an especially simple manner by laminating a foil on a substrate serving as projection screen. The foil can be manufactured for example by means of embossing with an engraved roller. A person skilled in the art will of course consider in case of respectively soft substrate materials to directly structure them with an engraved roller or to structure a plane matrix by moulding.

Further manufacturing methods of the structured projection screen according to the invention are sputtering or vapour deposition processes, electroplating methods, brushing, wiping, spraying or dip-coating of the substrate material.

In that case, the structures can be produced on the substrate by means of stencils or structured photoresist masks. As an alternative, laser structuring or a selective etching process can be used. From the above mentioned structuring methods, a person skilled in the art will choose the most suitable method depending on the structure size.

Optionally, a coating can be applied on the structure according to the invention. For example by means of sputtering or spin-coating methods, that can be easily done even on large areas. The structurally accurate coating of the structure of the projection screen can further improve its properties for example by reducing reflections or increasing the contrast.

An especially preferred coating of the structured projection screen is a spectrally selectively reflecting coating, in particular a coating according to DE 199 01 970 C2 or according to DE 197 47 597 A1. These coatings selectively reflect the irradiated narrow-band laser light and absorb or transmit a large part of the broad-band ambient light. That way, the contrast of the projected information is increased as desired. This is in particular of advantage because the achievable luminosity of the laser light sources cannot compete with that of conventional projection lamps, such as for example halogen or high-pressure gas discharge lamps.

In the following, the invention is explained in more detail with the help of three figures.

DESCRIPTION OF ILLUSTRATIVE EXAMPLES

Figure 1:
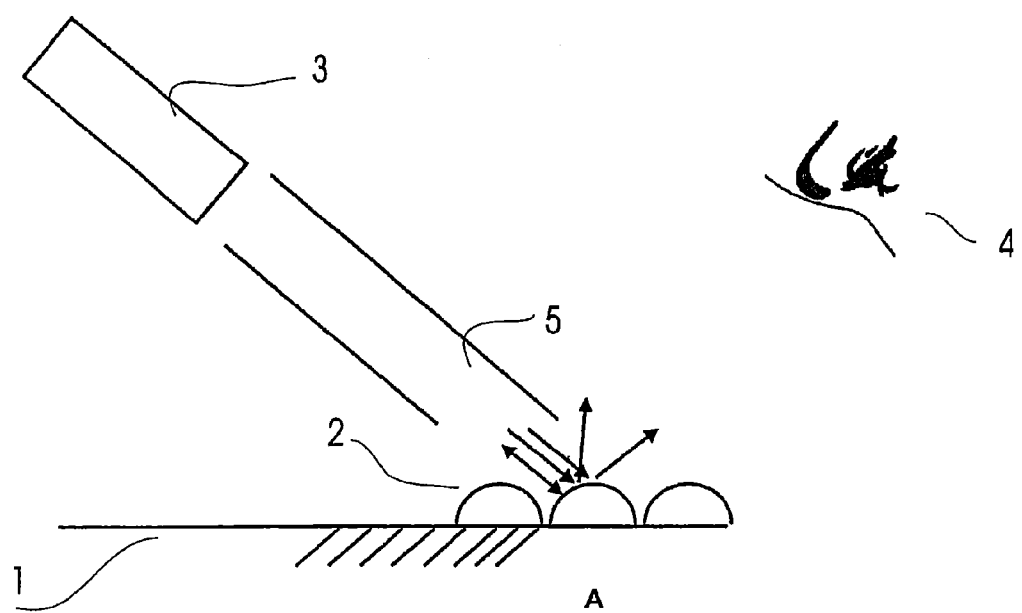
FIG. 1 shows the structured projection screen according to the invention when illuminated by a laser light source.

FIG. 1 shows a projection screen 1 having a structure 2 according to the invention. In this example, the structural elements are applied on the projection screen 1 in a hemispherical form. The projection screen according to the invention is illuminated with a laser light source 3. The size of the structural elements 2 is chosen in such manner that the beam cone 5 illuminates several structural elements 2. The laser light is reflected on the surface of the structural elements 2. Due to the curvature of the surface, the light is reflected in different directions from neighbouring points of impingement. Therefore, the wave trains of neighbouring points of impingement reach either only the eye of a viewer 4 or, within the eye of a viewer, different points of the retina. Therefore, an interference of these wave trains is not possible anymore and the speckle interferences are suppressed as desired.

Figure 2:
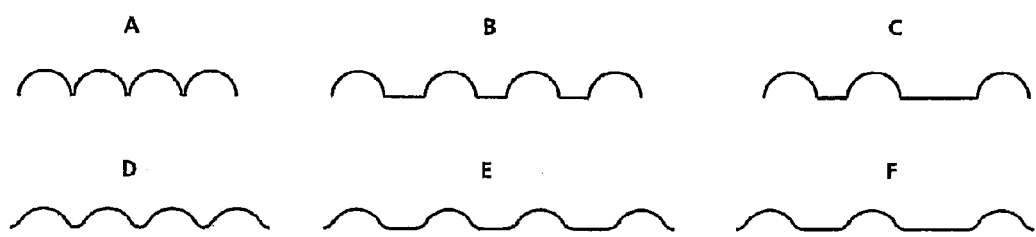
FIG. 2 shows possible forms of the structure in profile.

FIG. 2 shows six possible forms of the structure in profile. Example 2A shows a structure consisting of closely lined-up ball caps. According to the invention, however, it is also possible to arrange these ball caps at regular larger distances, as shown in example 2B.

Example 2C shows structural elements with irregular distances. If the distance areas between the structural elements in examples 2B and 2 C are not plane, there results a wave structure according to Example 2D. Such wave structure may have a one-dimensional design in the form of a corrugated sheet as well as the two-dimensional design similar to an egg package.

FIGS. 2 E and 2 F show structures the raised portions of which have a wave form, i.e., a sinus form, while the negative portions are replaced by plane area elements.

Figure 3:
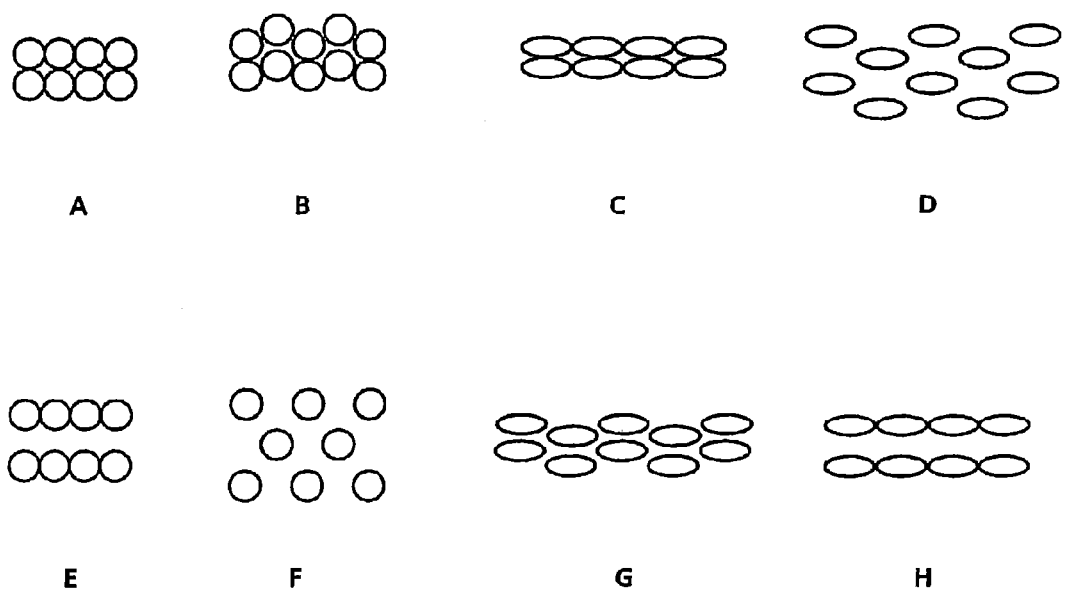
FIG. 3 shows possible arrangements of the structural elements.

FIG. 3 shows the structural elements according to the invention in top view. All the examples for embodiments shown in FIG. 3 are two-dimensional structures that reduce speckle interferences from all viewing angles. Example 3A shows round structural elements, such as ball- or sinus-shaped structural elements, that are lined-up by simple translation of the elements by always one structure width. Example 3B shows identical structural elements that, however, are offset by half an element width in one direction so that there results the densest possible packing of structural elements per area element. The distanced arrangement of structural elements shown in FIGS. 2 B, 2 C, 2 E and 2 F forms, in top view FIGS. 3 E and 3 F.

Depending on the desired emission angle, there are also imaginable asymmetric arrangements of structural elements that allow for a large viewing angle in one emission direction, but have only a clearly restricted emission angle in the other emission direction. Such structural elements are shown in FIGS. 3 C, 3 D, 3 G and 3 H. FIG. 3 C again shows the arrangement of structural elements offset by one structural element, analogously to FIG. 3 A. The densest possible packing, analogously to FIG. 3 B, is shown in FIG. 3 G. Of course, also these asymmetric structural elements can be arranged in a distanced manner, as shown in FIGS. 3 D and 3 H.

The invention claimed is:

1. A system for the presentation of images, the system comprising: a projection screen and a laser light source directing a beam having a given diameter toward the screen, the screen including a periodic structure of a given lateral dimension in which the beam is reflected or transmitted in different directions at an interface between the periodic structure and the adjacent environment, the beam diameter being about equal to the lateral dimension of the periodic structure.

2. The system of claim 1, wherein the ratio of the structure height to the structure width is between about 1:8 and 1:37.

3. The system of claim 1, wherein the structure shape is one selected from the group of: ball caps, ball disks, cones, truncated cones, paraboloids of revolution, hyperboloids of revolution, and ellipsoids of revolution.

4. The system of claim 1, wherein the structure comprises a foil laminated on a substrate.

5. The system of claim 1, wherein the structure comprises a molded surface.

6. The system of claim 1, further comprising a coating on the structure surface.

7. The system of claim 6, wherein the coating causes a spectrally selective reflection.

8. The system of claim 1, wherein the structure is reflective.

9. The system of claim 1, wherein adjacent shapes forming the periodic structure are spaced from each other by planar segments.

10. A method for the presentation of an image comprising the steps of:
    providing a laser light source having a beam of light having a given diameter, and
    directing the beam of light toward a projection screen having a periodic structure of a given lateral dimension that simultaneously redirects the beam of light in different directions, the beam diameter being about equal to the lateral dimension of the periodic structure.

11. The method of claim 10, wherein the simultaneous redirection in at least one plane has a maximum angle range of about ±40°.

12. The method of claim 11, wherein the simultaneous redirection in at least one plane has a maximum angle range of about ±10°.

13. The method of claim 10, further comprising the step of adjusting the beam diameter of the light beam to the lateral extension of the screen periodic structure.

* * * * *